US005406710A

United States Patent [19]

Zaiser

[11] Patent Number: 5,406,710

[45] Date of Patent: Apr. 18, 1995

[54] HAND CIRCULAR SAW

[75] Inventor: Adolf Zaiser, Koengen, Germany

[73] Assignee: Robert Bosch GmbH, Stuttgart, Germany

[21] Appl. No.: 78,314

[22] PCT Filed: Dec. 28, 1990

[86] PCT No.: PCT/DE91/00998

§ 371 Date: Jun. 18, 1993

§ 102(e) Date: Jun. 18, 1993

[87] PCT Pub. No.: WO92/11978

PCT Pub. Date: Jul. 23, 1992

[51] Int. Cl.[6] ........................ B27B 9/00; B23D 45/16

[52] U.S. Cl. ........................................ 30/391; 30/390

[58] Field of Search .................. 30/374, 373, 388, 390, 30/391, 370

[56] References Cited

U.S. PATENT DOCUMENTS

| | | | |
|---|---|---|---|
| 2,722,246 | 11/1955 | Arnoldy | 30/391 |
| 2,737,985 | 3/1956 | Utz | 30/391 |

FOREIGN PATENT DOCUMENTS

| | | |
|---|---|---|
| 2854369 | 10/1983 | Germany . |
| 3740200 | 8/1989 | Germany . |
| 3806814 | 9/1989 | Germany . |
| 3912307 | 10/1990 | Germany . |
| 3933261 | 4/1991 | Germany . |

*Primary Examiner*—Hwei Siu Payer

*Attorney, Agent, or Firm*—Michael J. Striker

[57] ABSTRACT

A hand circular saw has a saw blade, a support plate, a rocker swivelling the saw blade on the support plate about a swivel axis, a splitting wedge carrier, a splitting wedge which is held on the splitting wedge carrier and a guide device swivelling the splitting wedge about an axis of the saw blade, the guide device being formed as a tension-transmitting drive.

12 Claims, 2 Drawing Sheets

FIG. 4
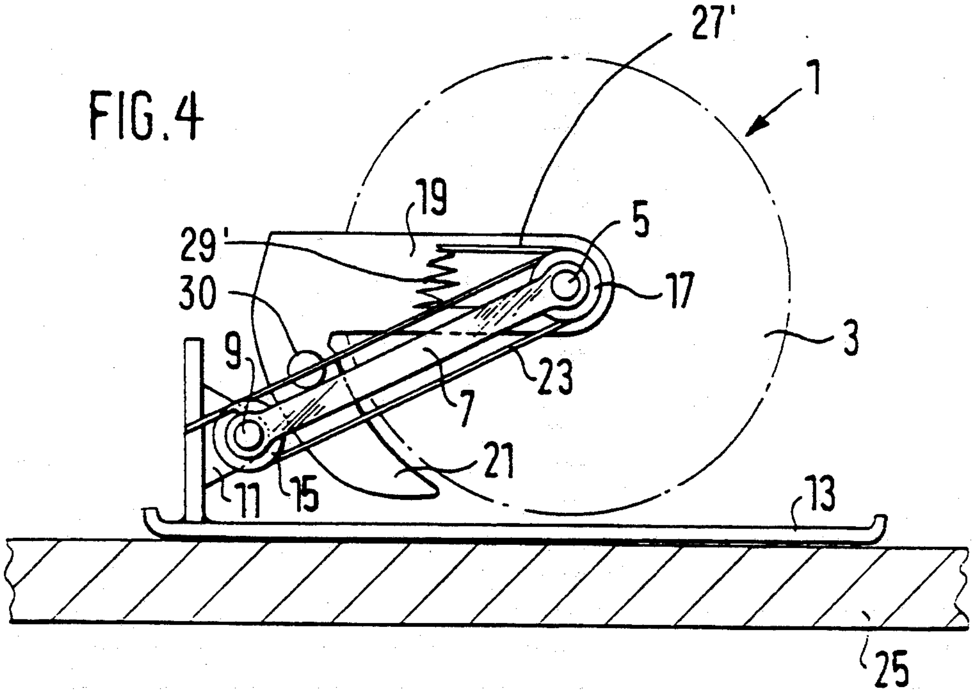
FIG. 10
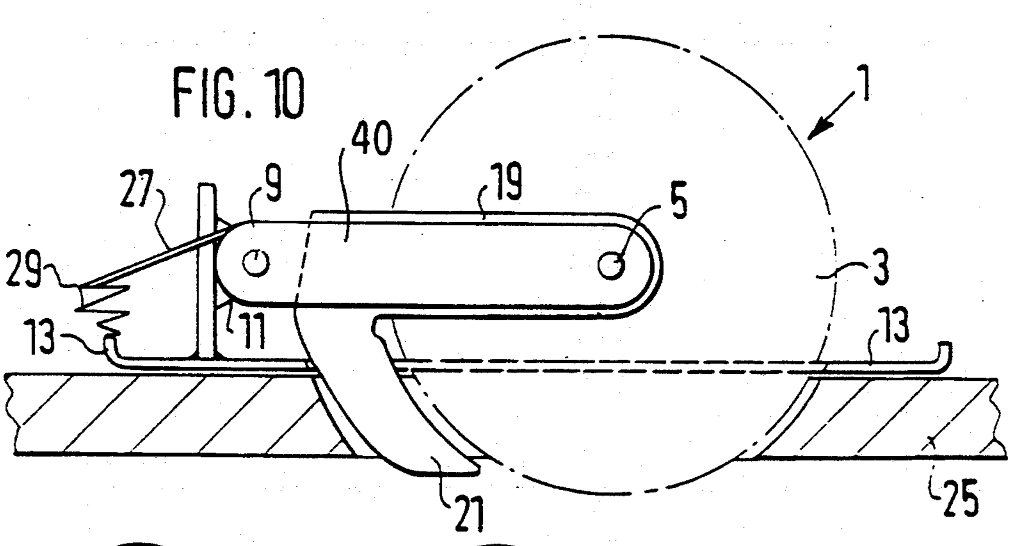
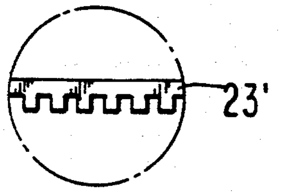
FIG. 5
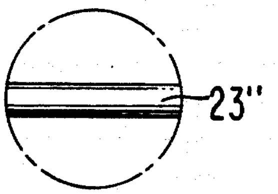
FIG. 6
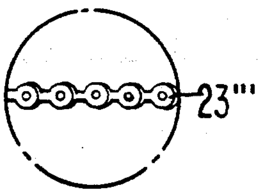
FIG. 7
FIG. 8
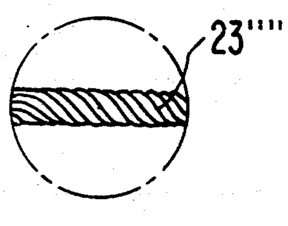
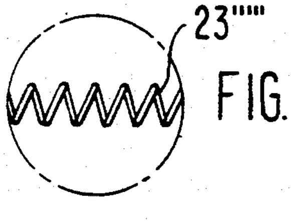
FIG. 9

HAND CIRCULAR SAW

BACKGROUND OF THE INVENTION

The present invention relates to a hand circular saw.

More particularly, it relates to a hand circular saw which has a saw blade swivellable on a support plate by means of a rocker about a swivel axis, and has a splitting wedge which is held on a splitting wedge carrier and by means of a guide device is swivellable about the axis of the saw blade.

From DE-C-28 54 369 (GB-B-800 625) a hand circular saw of this type is known. This saw is provided with a guide device for the splitting wedge and the casing of the hand circular saw. Together with the rocker carrying the saw blade the guide device forms a four-bar lever parallelogram. It holds the splitting wedge and the casing of the hand circular saw parallel to the support plate. If the rocker is swivelled, the splitting wedge and the casing of the hand circular saw follow it without changing the angular position.

Splitting wedges engage in the kerf formed in the workpiece during sawing. They maintain the distance between the halves of the workpiece, guide the rotating saw blade in a stable manner, and cover it. Sawing is thereby facilitated and the risk of injury is reduced. Splitting wedges are a legal requirement for circular saws. For reasons of working safety they must be permanently connected to the saw.

Plunge-cut or cross-cut saws are an exception; these can be lowered onto the workiece which is to be sawn. When the starting cut is made there is no room for the splitting wedge because no kerf has yet been made, so that before cutting starts the splitting wedge must be removed or be able to be uncoupled, through resilient suspension, from the swivelling movement of the rocker, as shown, for example, in the abovementioned patent specification.

A disadvantage of this guide device, which in itself is accurate and reliable, is constituted by the four joints, which are subject to wear. The joints are exposed to considerable shocks and the action of dust. In addition, the known guide device limits the swivelling angle of the hand circular saw and guidance becomes less accurate as the position of the rocker becomes steeper.

SUMMARY OF THE INVENTION

Accordingly, it is an object of the present invention to provide a hand circular saw, which avoids the disadvantages of the prior art.

In keeping with these objects and with others which will become apparent hereinafter, one feature of the present invention resides, briefly stated, in a hand circular saw of the above type, in which the guide device is formed as a tension-transmitting drive.

When the hand circular saw is designed in accordance with the present invention, it has in comparison therewith the advantage of a guide device which has a lighter and simpler construction and takes up little space, and which is particularly robust and requires little maintenance. Of the four joint points previously needed, two are eliminated. In addition, the swivelling range of the rocker is no longer limited. Guiding over the entire swivelling range is uniformly accurate. New working and application possibilities are thereby achieved.

In accordance with a further feature of the present invention, the guide device includes two rollers having the same diameter and carrying a tension-transmitting means in form of a rollable V-belt. The rollers can be mounted rotatably. The first roller an be rotatable against the spring force about the swivel axis, or it can be lockable. The second roller can be held non-rotatably on the splitting wedge, for example with interposition of a resilient member. The tension-transmitting means can be formed as belts, changes, cables, spiral springs and the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows an elastic fixing of a roller of the hand circular saw; and

FIGS. 5–10 are views showing several modifications of an endless belt of the hand circular saw.

DESCRIPTION OF THE PREFERRED EMBODIMENTS

Figure 1:
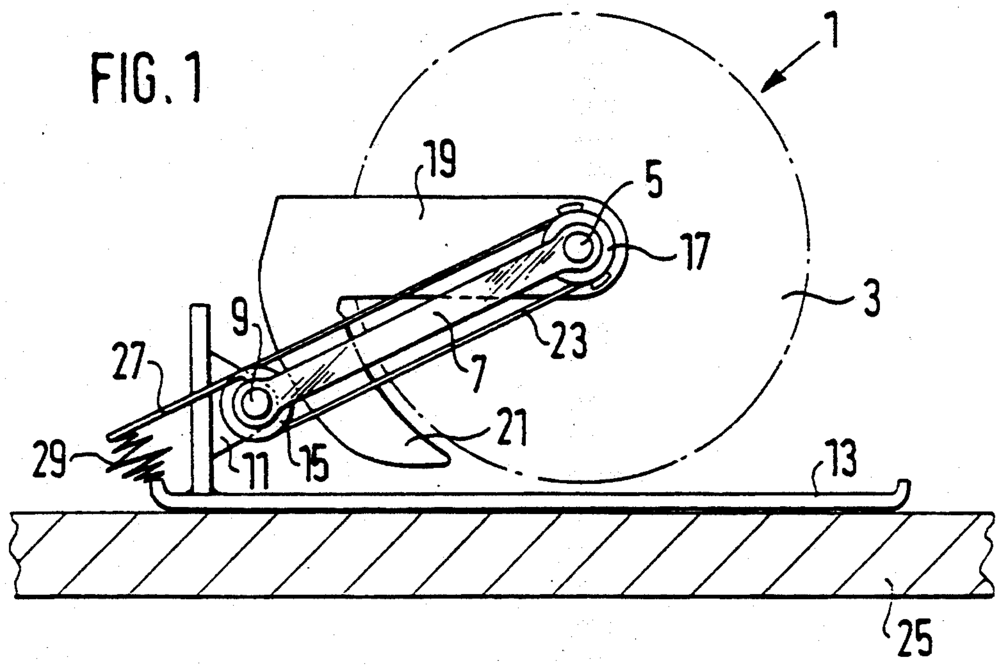
FIG. 1 shows the hand circular saw in the position of rest, with the saw blade swivelled out of the cutting position.

The hand circular saw 1 shown in FIG. 1, in which the motor and casing are not shown in detail, has a saw blade 3 mounted for rotation about an axis 5. A rocker 7 carries the axis 5 with the saw blade 3 and, together with the saw blade 3, is swivellable about a swivel axis 9. The swivel axis 9 is mounted on a bracket 11 connected to a support plate 13 of the hand circular saw 1. A first and a second roller 15, 17, which have the same diameter, are mounted on the rocker 7 with their axes parallel. The first roller 15 is rotatably mounted on the swivel axis 9, while the second roller 17 is rotatably mounted on the axis 5. The roller 17 carries a splitting wedge carrier 19, which is fastened for rotation with it for example by welding and which in turn carries a splitting wedge 21. An endless V-belt 23 over the first and second rollers 15, 17 forms with them a tension-transmitting drive. The first roller 15 carries a stop 27 which is coupled to the support plate 13 by a coil spring 29.

Figure 2:
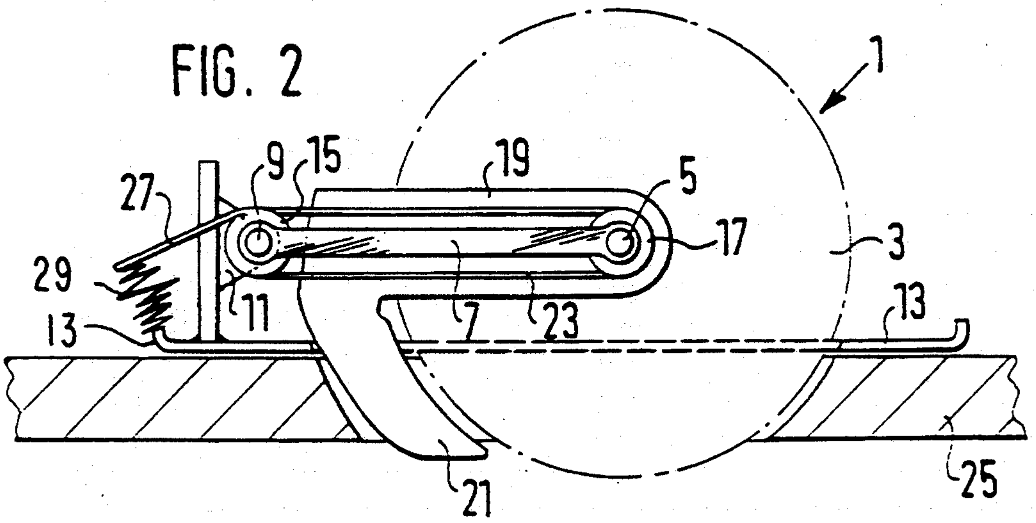
FIG. 2 shows the hand circular saw in the working position, with the splitting wedge lowered into a workpiece together with the saw blade.

The mode of operation of the guide device is described below with reference to FIGS. 2 and 3. In FIG. 2 the hand circular saw 1 is shown in the working position. The saw blade 3 is guided, together with the splitting wedge 21, in a kerf in the workpiece 25. The splitting wedge carrier 19 is held by the second roller 17 in a constant position relative to the support plate 13. This is made clear by comparison of the position of rest in FIG. 1 with the working position in FIG. 2.

Since the first roller 15 is coupled by means of the stop 27 and the coil spring 29 to the support plate 13, it can be rotated only against the force of the coil spring 29. When the tension-transmitting drive is acted on by forces smaller than the force of the coil spring 29, the first roller 15 is practically fastened to the machine frame and therefore non-rotatable. When the rocker 7 is swivelled, the V-belt 23 rolls on the first roller 15. The second roller 17 follows dependently, rotating in the same direction. With a transmission ratio of the rollers 15, 17 of 1:1, this rotation is synchronous. If therefore the rocker 7 makes a complete rotation about the swivel axis 9, the V-belt 23 will roll over the entire periphery of the first roller 15 oppositely to the direction of rotation of the rocker 7, while the second roller 17 will likewise be driven to make a complete rotation. The splitting wedge carrier 19 retains, likewise oppositely to the direction of rotation of the rocker 7, a constant angular position in relation to the support plate 13, whatever the position of the rocker 7.

Figure 3:
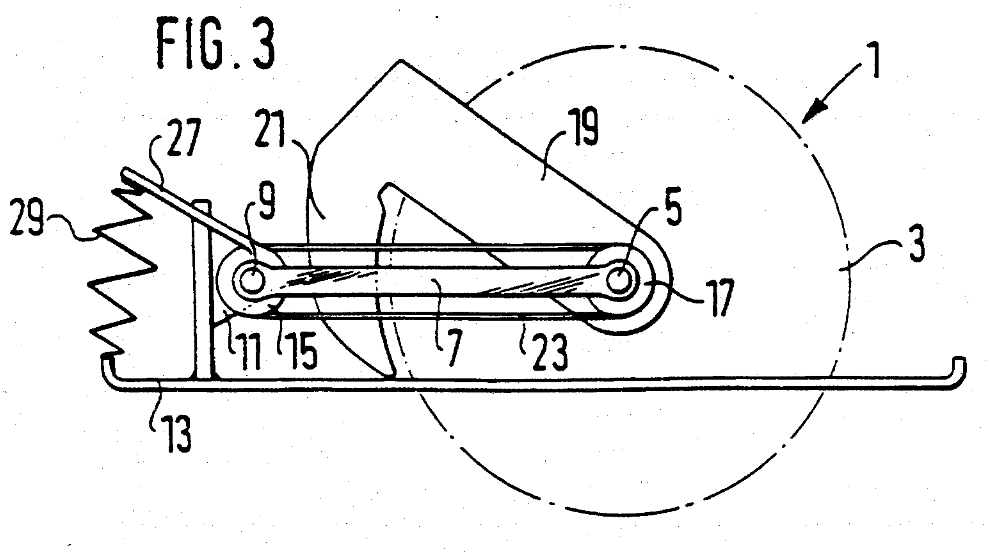
FIG. 3 shows the hand circular saw in the cutting position on penetration, with the splitting wedge blocked.

In FIG. 3 the hand circular saw 1 is shown during plunge cutting. The splitting wedge 21 is here blocked on the workpiece 25 and cannot follow the saw blade 3 vertically into the cutting position. This occurs when during plunge cutting an open kerf has not yet been made. The penetration of the saw blade 3 is however here not impeded by the blocked splitting wedge 21. Via the latter a force directed oppositely to that of the coil spring 29 acts on the tension-transmitting drive through the penetration infeed force, and said drive can turn oppositely to the adjustment direction dictated by the rocker 7. The same is true if, for example on the swivelling of the circular saw blade 3 towards the workpiece 25, the splitting wedge 21 encounters an obstacle and cannot follow the circular saw blade 3.

When in a horizontal feed movement of the hand circular saw an open kerf has been produced in the workpiece 25, the splitting wedge 21, loaded by the coil spring 29, can drop into said kerf to assume the prescribed protective position relative to the saw blade 3.

Instead of the stop 27 and the coil spring 29, with pivoting on the support plate 13, the first roller 15 may, for example, be mounted non-rotatably and the second roller 17 connected via a resilient coupling (not shown) to the splitting wedge carrier 19. The dimensions of this coupling or of the coil spring 29 depend on the size of the hand circular saw. Instead of the resilient coupling it is also possible to provide a slipping coupling or a freewheel coupling, which will then have to be turned back by hand into the desired position every time the splitting wedge 21 has been blocked. The desired position can be set by means of a stop (not shown).

The rocker 7 has a particularly advantageous configuration if it consists of two half-shells forming a hollow body which surrounds the tension-transmitting drive 15, 17, 23. The latter will then be particularly well protected against dirt and other external influences.

As can be seen from FIG. 4, the roller 17 can be elastically fixed by a stop 27' and a spring 29' relative to the splitting wedge carrier 19.

In addition to the previously mentioned V-belt 23, other suitable tension-transmitting means are endless cogged belts 23', round belts 23'', chains 23''', cables 23'''', spiral springs 23''''' and the like as shown in FIG. 5, or else the tension-transmitting means mentioned, in an open-ended but double arrangement. As shown in FIG. 10 the rocker can be formed as a hollow body 40.

It will be understood that each of the elements described above, or two or more together, may also find a useful application in other types of constructions differing from the types described above.

While the invention has been illustrated and described as embodied in a hand circular saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A hand circular saw, comprising a saw blade; a support plate; a rocker swivelling said saw blade on said support plate about a swivel axis; a splitting wedge carrier; a splitting wedge which is held on said splitting wedge carrier; and a guide device swivelling said splitting wedge about an axis of said saw blade, said guide device being formed as a tension-transmitting drive, said guide device including two rollers having a same diameter and carrying tension-transmitting means formed as a rollable V-belt.

2. A hand circular saw as defined in claim 1, wherein said rollers are rotatably mounted; and further comprising means for rotatably mounting said rollers.

3. A hand circular saw as defined in claim 2, wherein said rollers include a first roller which is rotatable about said swivel axis against a spring force.

4. A hand circular saw as defined in claim 3, wherein said rollers also include a second roller which is held non-rotatably on said splitting wedge.

5. A hand circular saw as defined in claim 4, wherein said second roller is connected non-rotatably to said splitting wedge carrier; and further comprising a resilient member interposed between said second roller and said splitting wedge carrier.

6. A hand circular saw as defined in claim 1, wherein said rocker is formed as a hollow body enclosing said tension-transmitting drive.

7. A hand circular saw comprising a saw blade, a support plate, a rocker swivelling said saw blade on said support plate about a swivel axis, a splitting wedge carrier, a splitting wedge which is held on said splitting wedge carrier, and a guide device swivelling said splitting wedge about an axis of said saw blade, said guide device being formed as a tension-transmitting drive, said tension-transmitting drive having tension transmitting means formed as a belt made of a spiral spring, and said guide device including two rollers having a same diameter and carrying the belt.

8. A hand circular saw, comprising a saw blade; a support plate; a rocker swivelling said saw blade on said support plate about a swivel axis; a splitting wedge carrier; a splitting wedge which is held on said splitting wedge carrier; and a guide device swivelling said splitting wedge about an axis of said saw blade, said guide device being formed as a tension-transmitting drive, said tension-transmitting drive having tension transmitting means formed as an endless V-belt, and said guide device including two rollers having a same diameter and carrying the endless V-belt.

9. A hand circular saw, comprising a saw blade; a support plate; a rocker swivelling said saw blade on said support plate about a swivel axis; a splitting wedge carrier; a splitting wedge which is held on said splitting wedge carrier; and a guide device swivelling said splitting wedge about an axis of said saw blade, said guide device being formed as a tension-transmitting drive, said tension-transmitting drive having tension transmitting means formed as a cogged belt, and said guide device including two rollers having a same diameter and carrying the cogged belt.

10. A hand circular saw, comprising a saw blade; a support plate; a rocker swivelling said saw blade on said support plate about a swivel axis; a splitting wedge carrier; a splitting wedge which is held on said splitting wedge carrier; and a guide device swivelling said splitting wedge about an axis of said saw blade, said guide device being formed as a tension-transmitting drive, said tension-transmitting drive having tension transmitting means formed as a round belt, and said guide device including two rollers having a same diameter and carrying the round belt.

11. A hand circular saw, comprising a saw blade; a support plate; a rocker swivelling said saw blade on said support plate about a swivel axis; a splitting wedge carrier; a splitting wedge which is held on said splitting wedge carrier; and a guide device swivelling said splitting wedge about an axis of said saw blade, said guide device being formed as a tension-transmitting drive, said tension-transmitting drive having tension transmitting means formed as a chain, and said guide device including two rollers having a same diameter and carrying the chain.

12. A hand circular saw, comprising a saw blade; a support plate; a rocker swivelling said saw blade on said support plate about a swivel axis; a splitting wedge carrier; a splitting wedge which is held on said splitting wedge carrier; and a guide device swivelling said splitting wedge about an axis of said saw blade, said guide device being formed as a tension-transmitting drive, said tension-transmitting drive having tension transmitting means formed as a cable, and said guide device including two rollers having a same diameter and carrying the cable.

* * * * *